United States Patent Office 2,850,483
Patented Sept. 2, 1958

2,850,483

CATALYTIC PRODUCTION OF POLYETHYLENE TEREPHTHALATE

James B. Ballentine, Kenneth R. Lea, and William K. Easley, Decatur, Ala., assignors to The Chemstrand Corporation, Decatur, Ala., a corporation of Delaware No Drawing. Application April 6, 1953
Serial No. 347,168

9 Claims. (Cl. 260—75)

This invention relates to an improved method for preparing a synthetic linear polyester, such as the condensation product of a polyhydric alcohol and a dibasic acid. More particularly, the invention is concerned with an improved method for the preparation of polyethylene terephthalate.

Synthetic linear condensation polyesters derived from glycols and dibasic acids, which are capable of being drawn into pliable, strong fibers showing, by characteristic X-ray patterns, orientation along the fiber axis are well known. Having such properties, these polyesters have proven to be of considerable value commercially, and particularly is this true of those polyesters formed from terephthalic acid and a glycol of the series $HO(CH_2)_nOH$ where $n$ is an integer from 2 to 10 inclusive. One of the most attractive polyesters or polymers of this class is polyethylene terephthalate. One of the best methods of producing polyethylene terephthalate involves an ester interchange between ethylene glycol and dimethyl terephthalate to form bis-2-hydroxyethyl terephthalate monomer which is then polymerized to polyethylene terephthalate under reduced pressure and at elevated temperatures.

However, difficulties have been encountered in the manufacture of polyethylene terephthalate by the ester interchange reaction. Obviously highly purified dimethyl terephthalate and highly purified glycol are preferred starting materials in order to form a uniform high quality product. It has been noted, however, that even these highly purified materials are very sluggish with respect to ester interchange and in the case of less purified reagents, the reaction is still too slow for practical commercial operation. Because of this slow rate of reaction, it has been found to be essential, in commercial operation, to employ a suitable catalyst to speed up the reaction.

Many catalysts have heretofore been proposed for the ester interchange reaction in the manufacture of polyethylene terephthalate. These catalysts have not proven to be entirely satisfactory since fibers and filaments produced from the condensation polymers using said heretofore known catalysts do not possess the desired whiteness or lack of color. Therefore, there has been a great desire in the art to find an ester interchange catalyst which not only speeds up the reaction into the realm of that considered necessary for economic purposes and which is useful over approximately the entire range of molecular weights desired in the finished polymer, but also, a catalyst which produces a condensation polymer of good color.

Accordingly, it is a primary purpose of the present invention to provide a new and improved process for producing polyethylene terephthalate which overcomes the disadvantages of prior art processes, pointed out hereinbefore, and produces a product of improved properties, particularly improved color in the condensation polymer and in articles produced therefrom.

It is another object of the invention to provide a new class of catalysts which accelerates ester interchange reaction between ethylene glycol and dimethyl terephthalate and produces polyethylene terephthalate having excellent whiteness.

It is a still further object of the invention to improve the reactions involved in the production of fiber- and filament-forming linear condensation polyesters formed from ethylene glycol and dimethyl terephthalate with respect to accelerating the same by means of new catalysts.

Other objects and advantages of the present invention will be apparent from the description thereof hereinafter.

In general, the objects of the present invention are accomplished by conducting the ester interchange between ethylene glycol and dimethyl terephthalate, and the subsequent polymerization of the resulting bis 2-hydroxyethyl terephthalate, in the presence of catalytic amounts of a metal salt of an organic aliphatic dibasic acid containing from 2 to 10 carbon atoms. Suitable metal salts are those of cadmium, cobalt, manganese and zinc. As examples of suitable catalysts there may be named zinc malonate, zinc succinate, zinc adipate, zinc azelate, zinc sebacate, manganese oxalate, manganese succinate, manganese adipate, manganese sebacate, cadmium malonate, cadmium succinate, cadmium sebacate, cobaltous oxalate, cobaltous succinate, cobaltous pimelate, cobaltous suberate, zinc pimelate, cobaltous sebacate, etc.

In the preparation of polyethylene terephthalate, by means of the ester-interchange reaction, the method comprises two steps. In the first step, ethylene glycol and dimethyl terephthalate are reacted at elevated temperatures and atmospheric pressure to form methanol, which is removed, and bis-2-hydroxyethyl terephthalate monomer. Thereafter, in the second step, the monomer is heated at still higher temperatures and under reduced pressure to form the polyethylene terephthalate with the elimination of glycol, which is readily volatilized under these conditions and removed from the system. The second step, or polymerization step, is continued until a fiber-forming polymer having the desired degree of polymerization, determined by intrinsic viscosity, is obtained. Without the aid of a suitable catalyst, the above reactions do not proceed at a noticeable rate.

The present invention proposes conducting both steps of the above-identified reaction in the presence of catalytic amounts of one of the catalysts named hereinbefore. A reasonably wide range of catalyst concentration may be employed, for example, 0.001 to 2.0% by weight, based on the weight of the dimethyl terephthalate. However, it is preferred to employ the catalyst in the range of 0.03 to 0.05% by weight.

During the first stage or initial condensation, a simple ester interchange takes place with the formation of bis-2-hydroxyethyl terephthalate. This portion of the reaction is carried out at atmospheric pressure and at a temperature in the range of 100 to 250° C. and preferably between 150 and 220° C. If desired, the reaction may be carried out at pressure above or below atmospheric but it is preferred to employ atmospheric pressure. During this first stage, methanol is evolved which is continually removed by distillation. At the completion of the first stage, the excess glycol, if any, is distilled off, prior to entering the second stage of the reaction.

The second stage, or polymerization stage, is conducted at reduced pressures. For optimum results, a pressure within the range of 0.1 to 5 mm. of mercury is used. This reduced pressure is necessary to remove the free ethylene glycol which is formed during this stage of the reaction. The ethylene glycol is volatilized under these conditions and removed from the system. The polymerization step is conducted at a temperature within the range of 220 to 300° C. The lower the temperature the longer the time to effect complete reaction. Further, it is desirable to maintain a nitrogen blanket over the reactants in order to prevent oxidation, said nitrogen containing less than 0.003% oxygen.

The polymerization step, or second stage, may be effected either in the liquid or melt phase or in the solid phase. In the liquid phase especially, reduced pressures must be employed in order to remove the free ethylene glycol which emerges from the polymer as a result of the condensation reaction.

When employing procedures heretofore known in the art, the ester interchange portion of the reaction, or first step, has taken place in approximately 1 to 5 hours. However, when employing the process of the present invention, using the new catalysts enumerated herein, the ester interchange takes place in 0.5 to 1.5 hours. Likewise, the polymerization or second step has heretofore taken place in approximately 1 to 10 to 1 to 30 hours, depending on catalyst concentration, temperature, intrinsic viscosity desired, amount of color allowable in the finished polymer, etc. With the present process the second step takes place in approximately 0.5 to 4 hours when employing the catalysts and conditions recited hereinbefore.

The linear condensation polyesters, produced in accordance with the present invention, have a melt viscosity of approximately 600–3,000 poises. This represents the fiber- and filament-forming polymers. It is to be understood, of course, that non-fiber-forming polyesters may be produced by means of the present invention, which have a greater or less melt viscosity than that reiterated above.

Melt viscosity, of the polymer, as referred to herein, is measured by timing the flow of the molten polymer through a glass tube between two reference points marked on the tube by applying a known pressure difference, as measured by a manometer. This is a direct application of Florey's method, and by using the following expression, the melt viscosity in poises can be determined.

$$\text{Melt viscosity (poises)} = \Delta P_{corr.} \cdot t \cdot C$$

where $\Delta P_{corr.}$ = corrected pressure differential (mm.)
$t$ = time of flow between reference points (seconds)
$C$ = calibrated constant $$\Delta P_{corr.} = \Delta P - \frac{D(H_1 + H_2)}{27.6}$$

where $\Delta P$ = observed pressure differential
$H_1$ = height (mm.) of lower reference point above melt surface
$H_2$ = height (mm.) of upper reference point above melt surface
$D$ = density of molten polymer at the temperature of the melt $$C = \frac{106A}{h_2^2 - h_1^2}$$

where $A$ = cross-section area of tube in cm.$^2$
$h_1 = H_1$ in cm.
$h_2 = H_2$ in cm.

To further illustrate the present invention and the advantages thereof, the following examples are given, it being understood that these are merely intended to be illustrative and not limitative. Unless otherwise indicated, all parts and percents are by weight.

In each of the Examples 1 to 5, the following procedure was employed: 40 parts of dimethyl terephthalate, 45 parts of ethylene glycol and an amount of catalyst, as indicated in Table I below, were placed in a reaction vessel fitted with a distilling column and heated to 180–190° C. for a period of 1–1.5 hours at atmospheric pressure. During this period methyl alcohol from the ester interchange reaction was distilled off and collected. Pure nitrogen (containing less than 0.003% oxygen) was bled into the reaction mixture at all times. After all the methyl alcohol was removed, the temperature of the reaction mixture was increased to 280–290° C. and the excess ethylene glycol was distilled off at atmospheric pressure. The system was then placed under a vacuum and the pressure reduced to 1 to 3 mm. mercury while maintaining the temperature at 280–290° C. The polymerization was allowed to proceed for approximately 2.5 to 3 hours to form a polymer in the fiber-forming range. The ethylene glycol, formed as a result of the polymerization, was distilled off and collected. Upon cooling the polymers formed, viscosity determinations were made, the results of which, along with other pertinent data, are listed in the following table:

Table I

| Example | Percent catalyst (based on wt. of dimethyl terephthalate) | Melt viscosity in poises (287° C.) | Color of melt [1] |
| --- | --- | --- | --- |
| 1 | 0.05% zinc succinate | 658 | Clear—light straw. |
| 2 | 0.05% zinc adipate | 685 | Do. |
| 3 | 0.10% zinc adipate | 1,175 | Clear—medium straw. |
| 4 | 0.05% zinc azelate | 698 | Clear—light straw. |
| 5 | 0.05% zinc sebacate | 757 | Do. |

[1] All of the polymers were white when cooled and crystallized.

From the above table it can be seen that all the polyesters produced had good color, and, in addition, fibers and filaments produced from the polyesters had the same good color. It is to be noted further, that increase in catalyst concentration resulted in increased melt viscosity of the product produced. It has also been noted that the melt viscosity will increase with increased purity of catalyst employed.

Similar beneficial results are obtained when employing aliphatic dibasic acid salts of cadmium, cobalt and manganese and the same general procedure as outlined above is employed. While all of the metal salts of the aliphatic dibasic acids, as described herein, are satisfactory for the purposes of the instant invention, it is preferred to employ the zinc salts since they are more reactive than the other salts, that is, it is possible to employ smaller amounts of the zinc salts and still obtain the desirable melt viscosity and good color, which is essential in the formation of fibers and filaments.

As pointed out hereinbefore, when employing the new catalysts of the present invention in producing polyethylene terephthalate by means of the ester interchange reaction, it is possible to produce polymerization products having improved color and articles, such as fibers and filaments, produced therefrom likewise have improved color, i. e., they are whiter than articles produced heretofore by prior art procedures.

This is an important advantage, and in fact, a very critical factor since, in the textile industry there is an extremely great desire for a white fiber or yarn that can be colored or dyed as desired. When a yarn is off-color when spun, it necessitates an additional bleaching step and further, off-color shades will result when such material is dyed, since the material being dyed is off-color.

The catalysts of the present invention are not affected by the amounts of water that are normally present during esterification, i. e., the water which is normally present in ethylene glycol. This contributes to the superior color of the finished product. Due to the fact that the present catalysts are not affected by the amounts of water normally present during esterification, there is faster reactivity during the first stage which also contributes to better color.

The catalysts of the present invention are more reactive than those of the prior art. The methyl alcohol is released almost immediately during the first stage when employing the instant catalysts and this is indicative of the catalyst activity. Very white polymerization products are produced by the process of the present invention and in addition, the polymers have a high molecular weight and produce fibers and filaments having good strength. Higher melt viscosities are obtainable when employing the catalysts of the instant invention than has heretofore been possible with prior art catalysts under the same conditions. Numerous other advantages will be apparent to those skilled in the art.

While the present invention has been described with respect to certain of its specific embodiments, it is to be understood that this is merely intended in an illustrative sense and changes and variations may be made without departing from the spirit and scope of the invention as defined in the appended claims.

We claim:

1. A process for producing polyethylene terephthalate comprising, reacting ethylene glycol and dimethyl terephthalate in the presence of a catalytic amount of a metal salt of a saturated aliphatic dicarboxylic acid containing from 2 to 10 carbon atoms, said metal being selected from the group consisting of cadmium, cobalt, manganese, and zinc, at a temperature in the range of 100 to 250° C. until no further methanol is liberated, and then continuing the reaction in the presence of said catalyst at elevated temperatures and reduced pressure until a linear polyester having a melt viscosity of about 600 to 3000 poises is obtained.

2. A process for producing polyethylene terephthalate comprising, reacting ethylene glycol and dimethyl terephthalate in the presence of a catalytic amount of a metal salt of a saturated aliphatic dicarboxylic acid containing from 2 to 10 carbon atoms, said metal being selected from the group consisting of cadmium, cobalt, manganese, and zinc, at a temperature in the range of 100 to 250° C. until no further methanol is liberated, and then continuing the reaction in the presence of said catalyst at a temperature in the range of 220 to 300° C. and a pressure of 0.1 to 5 mm. of mercury until a linear polyester having a melt viscosity of about 600 to 3000 poises is obtained.

3. The process as defined in claim 2 wherein there is employed 0.001 to 2.0% by weight of catalyst based on the weight of the dimethyl terephthalate.

4. The process defined in claim 3 wherein the catalyst is zinc succinate.

5. The process is defined in claim 3 wherein the catalyst is zinc adipate.

6. The process defined in claim 3 wherein the catalyst is zinc sebacate.

7. The process defined in claim 3 wherein the catalyst is manganous succinate.

8. The process defined in claim 3 wherein the catalyst is cadmium succinate.

9. In the process for producing polyethylene terephthalate wherein ethylene glycol and dimethyl terephthalate are reacted to form bis-2-hydroxyethyl terephthalate which is thereafter polymerized at a temperature in the range of 220 to 300° C. and reduced pressure until polyethylene terephthalate having a melt viscosity of about 600 to 3000 poises is produced, the improvement comprising conducting both steps of the reaction in the presence of a catalytic amount of a metal salt of an aliphatic dicarboxylic acid containing from 2 to 10 carbon atoms, said metal being selected from the group consisting of cadmium, cobalt, manganese and zinc.

References Cited in the file of this patent

UNITED STATES PATENTS

| | | |
|---|---|---|
| 2,465,319 | Whinfield et al. | Apr. 22, 1949 |
| 2,534,028 | Izard | Dec. 12, 1950 |
| 2,578,660 | Auspos et al. | Dec. 18, 1951 |
| 2,602,784 | Taylor | July 8, 1952 |
| 2,681,360 | Dodonik | June 15, 1954 |

OTHER REFERENCES

Baroni, Chem. Abstr., vol. 35, page 13355.